(12) United States Patent
Okuda et al.

(10) Patent No.: US 12,449,164 B2
(45) Date of Patent: Oct. 21, 2025

(54) HEAT PUMP

(71) Applicant: Yanmar Power Technology Co., Ltd., Osaka (JP)

(72) Inventors: Norihiro Okuda, Osaka (JP); Sachie Tsujikawa, Osaka (JP); Terunori Aikawa, Osaka (JP); Shingo Okada, Osaka (JP)

(73) Assignee: YANMAR POWER TECHNOLOGY CO., LTD., Osaka (JP)

( * ) Notice: Subject to any disclaimer, the term of this patent is extended or adjusted under 35 U.S.C. 154(b) by 195 days.

(21) Appl. No.: 17/914,058

(22) PCT Filed: Mar. 1, 2021

(86) PCT No.: PCT/JP2021/007713
§ 371 (c)(1),
(2) Date: Sep. 23, 2022

(87) PCT Pub. No.: WO2021/192828
PCT Pub. Date: Sep. 30, 2021

(65) Prior Publication Data
US 2023/0117450 A1    Apr. 20, 2023

(30) Foreign Application Priority Data
Mar. 25, 2020 (JP) ................. 2020-053962

(51) Int. Cl.
F25B 5/02 (2006.01)
(52) U.S. Cl.
CPC ..................... F25B 5/02 (2013.01)

(58) Field of Classification Search
CPC ...... F25B 5/02; F25B 5/04; F25B 6/02; F25B 6/04; F25B 41/40; F25B 41/42
See application file for complete search history.

(56) References Cited

U.S. PATENT DOCUMENTS

| | | | |
|---|---|---|---|
| 10,907,866 B2 | 2/2021 | Matsuda et al. | |
| 2014/0245766 A1* | 9/2014 | Wakamoto | F25B 47/022 62/151 |
| 2019/0024963 A1* | 1/2019 | Kobayashi | F28D 21/0003 |

(Continued)

FOREIGN PATENT DOCUMENTS

| | | | | |
|---|---|---|---|---|
| JP | 57157973 A | | 9/1982 | |
| JP | 01089806 A | * | 4/1998 | ............. F25B 39/02 |
| JP | 2006207982 A | | 8/2006 | |

(Continued)

OTHER PUBLICATIONS

English translation of Iitaka et al. (WO 2015122168 A1). (Year: 2015).*

(Continued)

*Primary Examiner* — Miguel A Diaz
(74) *Attorney, Agent, or Firm* — NORTON ROSE FULBRIGHT US LLP

(57) ABSTRACT

A heat pump includes a first outdoor heat exchanger and a second outdoor heat exchanger which are mutually connected in parallel; a merge part at which refrigerant that has flown out from the first outdoor heat exchanger and the second outdoor heat exchanger is configured to merge; and a third outdoor heat exchanger that is connected to the merge part.

16 Claims, 3 Drawing Sheets

(56) References Cited

U.S. PATENT DOCUMENTS

2019/0383532 A1* 12/2019 Mizutani .................. F25B 6/00
2020/0191416 A1*  6/2020 Okuda ..................... F24F 1/18

FOREIGN PATENT DOCUMENTS

| JP | 2016508590 A | 9/2014 | |
|---|---|---|---|
| JP | 2016099067 A | 5/2016 | |
| JP | 2016106211 A | 6/2016 | |
| WO | WO-2015122168 A1 * | 8/2015 | ............... F24F 1/10 |
| WO | WO-2016080464 A1 * | 5/2016 | .............. F25B 43/02 |
| WO | 2016088748 A1 | 6/2016 | |
| WO | 2018008139 A1 | 1/2018 | |
| WO | 2018025318 A1 | 2/2018 | |

OTHER PUBLICATIONS

English translation of Okuda et al. (WO-2016080464-A1). (Year: 2016).*
Japanese Office Action dated Feb. 28, 2023 issued for JP Application No. 2020053962.
Japanese Office Action dated Jun. 13, 2023 issued for JP Application No. 2020053962.
International Search Report dated Mar. 30, 2021 issued in corresponding PCT Application PCT/JP2021/007713.

* cited by examiner

HEAT PUMP

CROSS-REFERENCE TO RELATED APPLICATIONS

This application is a national stage application pursuant to 35 U.S.C. § 371 of International Application No. PCT/JP2021/007713, filed on Mar. 1, 2021 which claims priority under 35 U.S.C. § 119 to Japanese Patent Application No. 2020-053962 filed on Mar. 25, 2020, the disclosures of which are hereby incorporated by reference in their entireties.

TECHNICAL FIELD

The present invention relates to a heat pump which circulates a refrigerant for cooling and heating.

BACKGROUND ART

Conventionally, a heat pump performs cooling and heating operations by exchanging heat of a refrigerant in a heat exchanger. In order to improve heat exchange efficiency, a heat pump provided with a plurality of heat exchangers has been proposed (see, for example, Patent Literature 1).

CITATION LIST

Patent Literature

Patent Literature 1: Japanese Patent Laid-Open Publication No. 2016-99067

DISCLOSURE OF INVENTION

Problems to be Solved by the Invention

The heat pump disclosed in Patent Literature 1 includes a compressor and an oil separator, and an open/close valve is provided in an oil return path to return oil from the oil separator to the compressor. Two heat exchangers connected in parallel are also provided in an outdoor unit. In case of attempting to further increase the number of heat exchangers in the heat pump mentioned above, when all heat exchangers are connected in parallel, a flow rate of a refrigerant flowing into each of the heat exchangers became small, so that it led to a problem in which a heat transfer efficiency was degraded and thus heat exchange was improperly performed.

The present invention is made to solve the problem mentioned above, and an object of the invention is to provide a heat pump capable of improving a heat transfer efficiency by preventing a refrigerant from decreasing in a flow rate.

Means for Solving the Problems

A heat pump according to the present invention, which circulates a refrigerant for cooling and heating, includes: a first outdoor heat exchanger and a second outdoor heat exchanger that are connected in parallel with each other; a merge part in which refrigerants flowing out of the first outdoor heat exchanger and the second outdoor heat exchanger merge; and a third outdoor heat exchanger connected to the merge part.

In the heat pump according to the present invention, the third outdoor heat exchanger may have a smaller fin pitch than the fin pitches of the first outdoor heat exchanger and the second outdoor heat exchanger.

The heat pump according to the present invention further includes a casing to house the first outdoor heat exchanger, the second outdoor heat exchanger, and the third outdoor heat exchanger, wherein the first outdoor heat exchanger and the second outdoor heat exchanger may be located along facing sidewalls that face each other inside the casing, respectively, and the third outdoor heat exchanger may be located along an adjacent sidewall adjacent to the two facing sidewalls In the heat pump according to the present invention, a corner of the casing may house piping that is connected to at least one of the first outdoor heat exchanger, the second outdoor heat exchanger, and the third outdoor heat exchanger.

The heat pump according to the present invention further includes an oil separator and a first gaseous refrigerant circuit and a second gaseous refrigerant circuit that deliver gaseous refrigerant separated with the oil separator, wherein the first gaseous refrigerant circuit may be connected between connection ports of the first outdoor heat exchanger and the second outdoor heat exchanger, and the merge part, and the second gaseous refrigerant circuit may be connected to the other connection port side of the third outdoor heat exchanger.

The heat pump according to the present invention further includes: an oil separator, a four-way valve, and a compressor that are housed in a casing; and a separation plate to separate an inside of the casing into a first chamber and a second chamber, wherein the first chamber may house the first outdoor heat exchanger, the second outdoor heat exchanger, and the third outdoor heat exchanger, and the second chamber may house the oil separator, the four-way valve, and the compressor.

The heat pump according to the present invention further includes a first gaseous refrigerant circuit and a second gaseous refrigerant circuit that deliver gaseous refrigerant separated with the oil separator, wherein the first gaseous refrigerant circuit may be connected between connection ports of the first outdoor heat exchanger and the second outdoor heat exchanger, and the merge part, and the second gaseous refrigerant circuit is connected to the other connection port side of the third outdoor heat exchanger.

In the heat pump according to the present invention, the first gaseous refrigerant circuit may be connected to piping that constitutes the merge part in the first chamber, the second gaseous refrigerant circuit may be connected, in the second chamber, to piping that leads to the other connection port of the third outdoor heat exchanger, and the separation plate may have an opening through which the first gaseous refrigerant circuit passes.

Effect of the Invention

According to the present invention, by merging the refrigerant flowing out from the first outdoor heat exchanger and that from the second outdoor heat exchanger, a flow rate of the refrigerant flowing into the third outdoor heat exchanger can be greater, and thereby improving a heat transfer efficiency.

DESCRIPTION OF EMBODIMENTS

Now, a heat pump according to an embodiment of the present invention will be described below with reference to the drawings.

Figure 1:
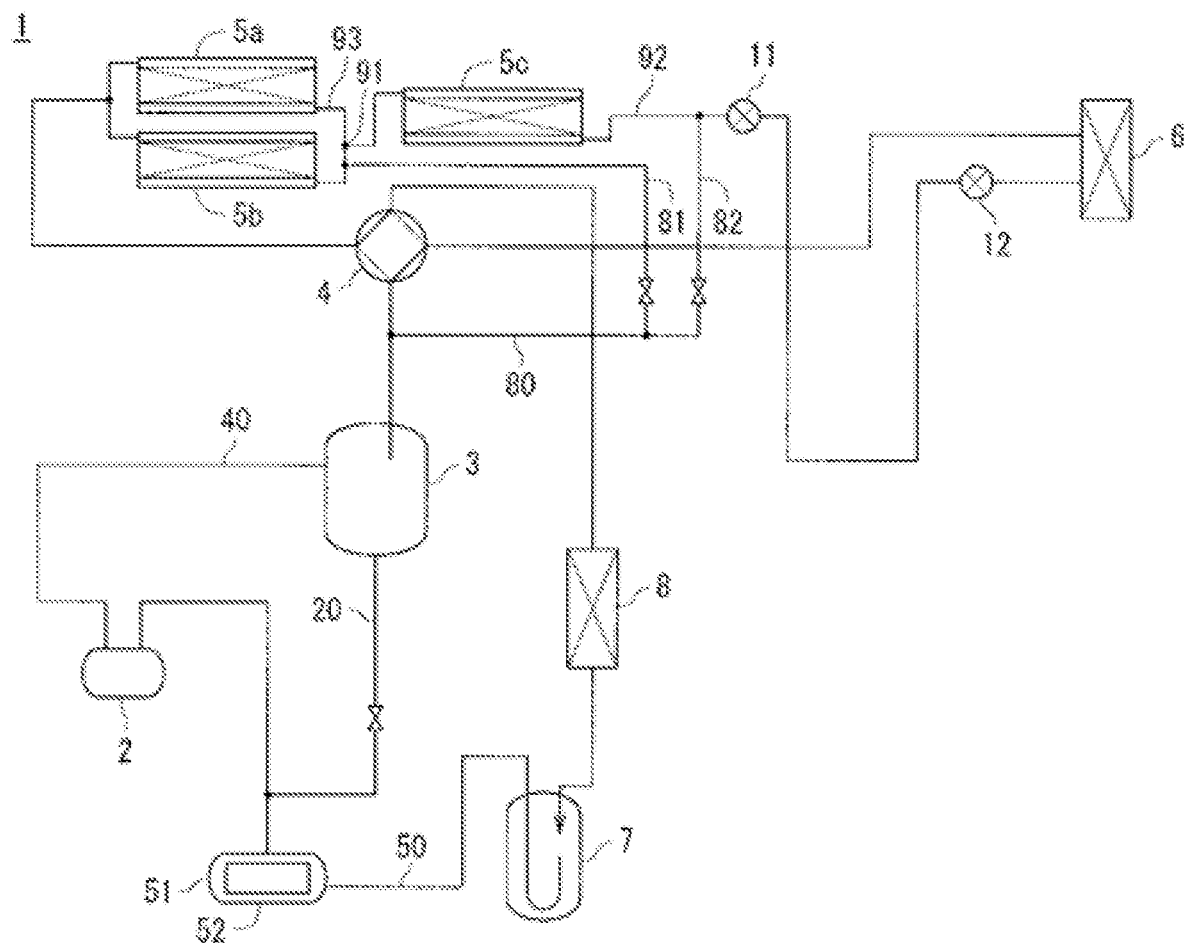
FIG. 1 shows a simplified circuit diagram of a refrigerant circuit of a heat pump according to an embodiment of the present invention.

FIG. 1 is a simplified circuit diagram illustrating a refrigerant circuit of a heat pump according to an embodiment of the present invention.

The heat pump 1 has an outdoor unit to perform heat exchange with outdoor air and an indoor unit to perform heat exchange with indoor air. The outdoor unit has a compressor 2, an oil separator 3, a four-way valve 4, outdoor heat exchangers (a first outdoor heat exchanger 5a, a second outdoor heat exchanger 5b, and a third outdoor heat exchanger 5c), an accumulator 7, a heat exchanger for evaporation 8, and an outdoor expansion valve 11. The indoor unit has an indoor heat exchanger 6 and an indoor expansion valve 12.

The compressor 2 is driven with a driving source such as a gas engine 104 (see FIG. 2 referred later), for example. A plurality of compressors 2 may be configured to be connected in parallel and may be driven with a single gas engine 104 via a belt or a flywheel. Each of the plurality of the compressors 2 may be selectively driven with it using a clutch provided. A discharge path 40 of the compressor 2 is connected to the four-way valve 4 via the oil separator 3.

High temperature and high pressure gaseous refrigerant discharged from the compressor 2 is directed to the outdoor heat exchangers or the indoor heat exchanger 6 with the four-way valve 4. During a heating operation (solid line) the four-way valve 4 delivers the gaseous refrigerant to the indoor heat exchanger 6, and during cooling operation (one-dot chain line) the four-way valve 4 delivers the gaseous refrigerant to the outdoor heat exchangers.

During the heating operation, the indoor heat exchanger 6 transfers heat from the refrigerant to the indoor air and causes the gaseous refrigerant to change into a liquid state with low temperature and high pressure. Then, the refrigerant is delivered to the outdoor heat exchangers via the indoor expansion valve 12 and the outdoor expansion valve 11. A degree of opening of each of the indoor expansion valve 12 and the outdoor expansion valve 11 is controlled by a controller or the like as appropriate.

During the heating operation, the outdoor expansion valve 11 expands the liquid refrigerant and causes the liquid refrigerant to change into a liquid state (fog state) with low temperature and low pressure. Then, the outdoor heat exchangers transfer heat from the outdoor air to the refrigerant and causes the refrigerant to change into a gaseous state with low temperature and low pressure. After passing through the outdoor heat exchangers, the refrigerant passes through the four-way valve 4 and is delivered to a suction path 50 of the compressors 2.

The outdoor heat exchangers consists of the first outdoor heat exchanger 5a and the second outdoor heat exchanger 5b, which are connected in parallel with each other, and the third outdoor heat exchanger 5c connected in series with the first outdoor heat exchanger 5a and the second outdoor heat exchanger 5b. A connection port of the first outdoor heat exchanger 5a is connected to that of the second outdoor heat exchanger 5b with a merge part 91 via a branch piping 93. Then, one connection port (left side in FIG. 1) of the third outdoor heat exchanger 5c is connected to the merge part 91, and the other connection port (right side in FIG. 1) of the third outdoor heat exchanger 5c is connected to the outdoor expansion valve 11 through a connection piping 92. For the convenience of explanation, the first outdoor heat exchanger 5a, the second outdoor heat exchanger 5b, and the third outdoor heat exchanger 5c may be referred to as the outdoor heat exchangers collectively.

Specifically, during the heating operation, the refrigerant is delivered from the outdoor expansion valve 11 to the third outdoor heat exchanger 5c through the connection piping 92. Then, the refrigerant from the third outdoor heat exchanger 5c is distributed to the first outdoor heat exchanger 5a and the second outdoor heat exchanger 5b through the merge part 91. Then, the refrigerant is delivered from the first outdoor heat exchanger 5a and the second outdoor heat exchanger 5b to the four-way valve 4. Similarly to the connection ports on the side of the merge part 91, a branch piping may connect a connection port of the first outdoor heat exchanger 5a and that of the second outdoor heat exchanger 5b between the first outdoor heat exchanger 5a and the second outdoor heat exchanger 5b, and the four-way valve 4.

The accumulator 7 is provided in a path between the four-way valve 4 and the compressor 2. The accumulator 7 temporarily stores the gaseous refrigerant. The gaseous refrigerant contains a small amount of a liquid refrigerant. These are separated in the accumulator 7, and the liquid refrigerant is accumulated in the accumulator 7.

Furthermore, the heat exchanger for evaporation 8 is provided between the four-way valve 4 and the accumulator 7. The heat exchanger for evaporation 8 is defined as a heat exchanger which is heated with the gas engine 104 of being the driving source for the compressor 2 and the like, for example. A cooling water for the gas engine 104 may be circulated through the heat exchanger for evaporation 8 so as to warm the refrigerant passing through the heat exchanger for evaporation 8.

A filter housing part 51 to accommodate a filter 52 is provided in the suction path 50 connecting the accumulator 7 and the compressor 2. The filter 52 adsorbs a foreign matter contained in the refrigerant. By providing the filter 52, dirt from the refrigerant and oil can be removed as well as the refrigerant and the oil can be kept clean. When a plurality of compressors 2 are provided, the path may be branched into multiple paths from the filter housing part 51.

On the other hand, during a cooling operation, the high temperature and high pressure gaseous refrigerant discharged from the compressor 2 is delivered via the four-way valve 4 to the outdoor heat exchangers which perform heat exchange with the outdoor air to bring the refrigerant into a low temperature and high pressure liquid state. The refrigerants having passed through the outdoor heat exchangers are brought into a low temperature and low pressure liquid state (fog state) by passing through the outdoor expansion valve 11.

Specifically, during cooling operation, the refrigerant is delivered through the four-way valve 4 to the first outdoor heat exchanger 5a and the second outdoor heat exchanger 5b, which are connected in parallel with each other. After merging at the merge part 91, the refrigerant is delivered to the outdoor expansion valve 11 through the third outdoor heat exchanger 5c. In this way, by merging the refrigerant flowing out from the first outdoor heat exchanger 5a and that from the second outdoor heat exchanger 5b, a flow rate of the refrigerant flowing into the third outdoor heat exchanger 5c can be greater, and thus a heat transfer efficiency can be improved.

Then, the refrigerant is delivered through the indoor expansion valve 12 to the indoor heat exchanger 6 which performs heat exchange with the indoor air to bring the refrigerant into a low temperature and low pressure gaseous state. The refrigerant delivered from the indoor heat exchanger 6 is then delivered to the suction path of the compressor 2 after passing through the four-way valve 4 and the accumulator 7.

The oil separator 3 is provided in a path between the four-way valve 4 and the compressor 2. The oil separator 3 separates oil contained in the refrigerant. The oil separator 3 is connected to an oil return piping 20 to supply the separated oil to the compressor 2. The oil return piping 20 is connected to a downstream side of the filter housing part 51 in the suction path 50. A solenoid valve or the like may be provided in the oil return piping 20 and control supply of the oil.

The oil separator 3 is also connected to a gaseous refrigerant circuit 80 (a first gaseous refrigerant circuit 81 and a second gaseous refrigerant circuit 82) through which the separated gaseous refrigerant (hot gas) is delivered. The first gaseous refrigerant circuit 81 and the second gaseous refrigerant circuit 82 are connected to the branch piping 93 and the connection piping 92, respectively. By providing the first gaseous refrigerant circuit 81 and the second gaseous refrigerant circuit 82 to deliver the high temperature gaseous refrigerant to the outdoor heat exchangers, it is possible to improve a defrosting performance during the heating operation. The solenoid valve or the like may be provided in each of the first gaseous refrigerant circuit 81 and the second gaseous refrigerant circuit 82 in order to control supply of the gaseous refrigerant.

As mentioned above, during the heating operation, the first gaseous refrigerant circuit 81 is connected to an upstream side of the first outdoor heat exchanger 5a and the second outdoor heat exchanger 5b, while the second gaseous refrigerant circuit 82 is connected to an upstream side of the third outdoor heat exchanger 5c in a flowing direction of the refrigerant.

Assuming that only the first gaseous refrigerant circuit 81 is provided, it is impossible to defrost the third outdoor heat exchanger 5c. On the other hand, assuming that only the second gaseous refrigerant circuit 82 is provided, since most of heat is consumed to defrost the third outdoor heat exchanger 5c, it is concerned that the first outdoor heat exchanger 5a and the second outdoor heat exchanger 5b may not be sufficiently defrosted. In this embodiment, by connecting the gaseous refrigerant circuits to the first outdoor heat exchanger 5a and the second outdoor heat exchanger 5b, as well as to the third outdoor heat exchanger 5c, respectively, the gaseous refrigerant can be properly delivered to them, and defrosting performance can be sufficiently achieved.

Figure 2:
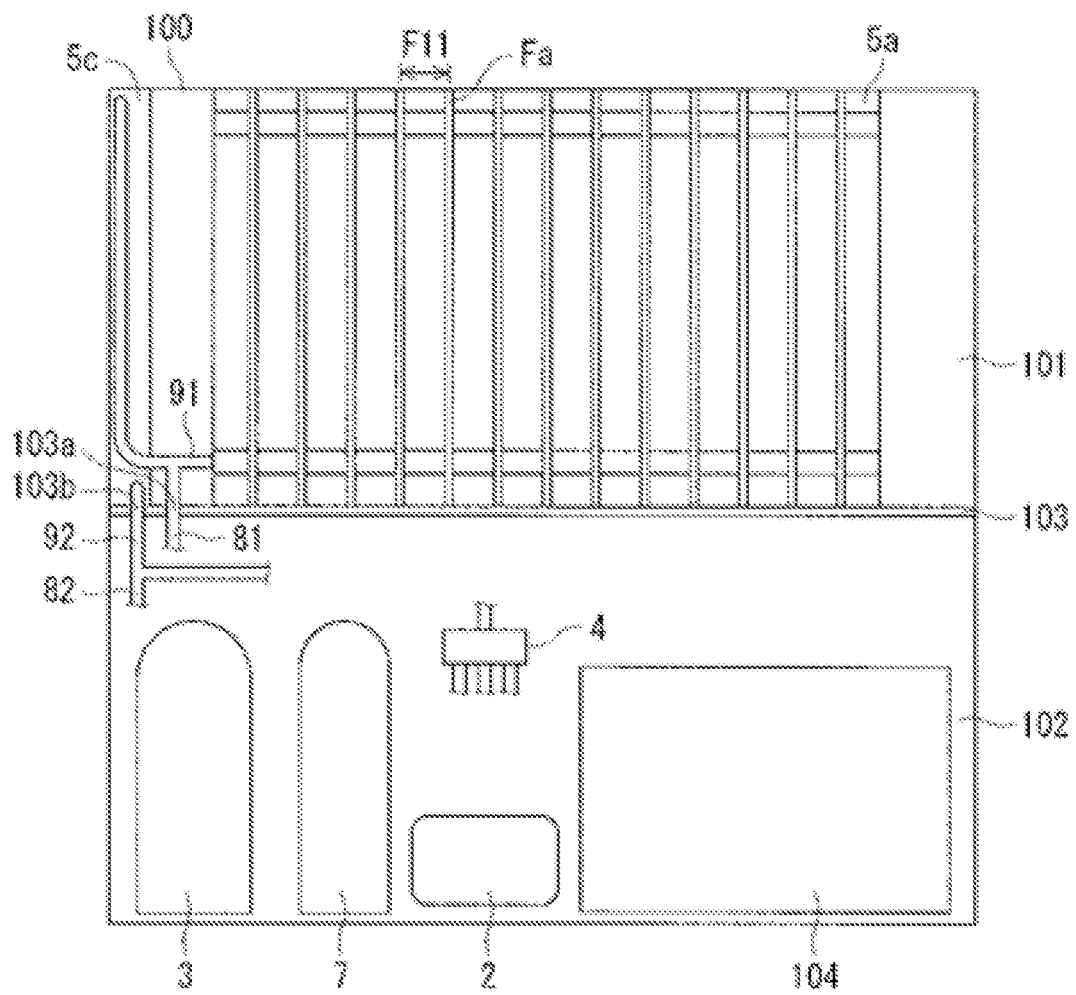
FIG. 2 shows a schematic side view of a casing of an outdoor unit.
Figure 3:
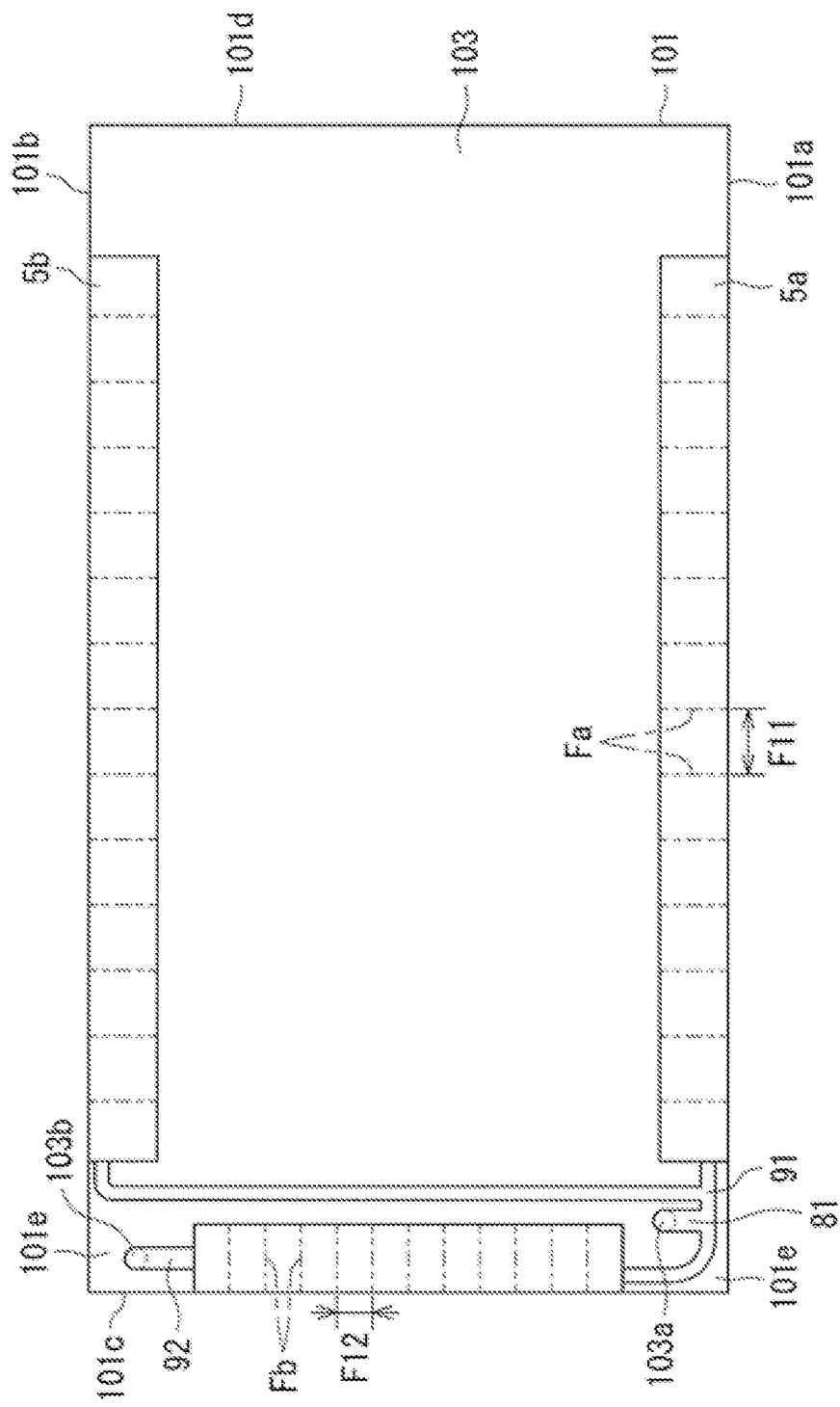
FIG. 3 shows a schematic top view of the casing of the outdoor unit shown in FIG. 2.

FIG. 2 is a schematic side view of a casing of an outdoor unit, and FIG. 3 is a schematic top view of the casing of the outdoor unit shown in FIG. 2. FIGS. 2 and 3 show the casing 100 in a transparent manner for the convenience of viewing.

The outdoor unit is provided with a casing 100 which houses the above mentioned components. The inside of the casing 100 is separated into a first chamber 101 and a second chamber 102 by a separation plate 103. In this embodiment, the first chamber 101 and the second chamber 102 are provided on the upper side and the lower side of the casing 100, respectively. The first chamber 101 houses the first outdoor heat exchanger 5a, the second outdoor heat exchanger 5b, and the third outdoor heat exchanger 5c. The second chamber 102 houses components other than the outdoor heat exchanger, such as the oil separator 3, the accumulator 7, the compressor 2, the four-way valve 4, the gas engine 104, etc. FIG. 2 schematically shows a part of the components housed in the casing 100. However, any component other than components shown in FIG. 2 may be housed in the second chamber 102 as appropriate. In this way, by housing the components separately in the first chamber 101 and the second chamber 102, transfer of exhaust heat can be suppressed and the heat exchange efficiency in the first chamber 101 can be improved.

The first chamber 101 has a rectangular shape by a top view with two facing sidewalls (a first facing sidewall 101a and a second facing sidewall 101b) and adjacent sidewalls (a first adjacent sidewall 101c and a second adjacent sidewall 101d) adjacent to the first and second facing sidewalls 101a and 101b and facing each other. The facing sidewalls and the adjacent sidewalls correspond to longer sides and shorter sides by the top view, respectively. Namely, an area of the facing sidewall is larger than that of the adjacent sidewall.

The first outdoor heat exchanger 5a, the second outdoor heat exchanger 5b, and the third outdoor heat exchanger 5c are located along the first facing sidewall 101a, the second facing sidewall 101b, and the first adjacent sidewall 101c, respectively. Each of the first outdoor heat exchanger 5a, the second outdoor heat exchanger 5b, and the third outdoor heat exchanger 5c constitutes a part of the sidewall of the casing 100 by itself and is exposed to the outside. The present invention is not limited thereto, in an alternative example where the outdoor heat exchangers are enclosed inside the casing 100, openings may be made on portions of a sidewall facing each of the outdoor heat exchangers among the sidewalls of the casing 100 to allow the outside air to enter the casing 100. In this way, the outdoor heat exchangers are located along the sidewalls, this makes it possible to keep a space inside the casing 100 larger, thereby improving the layout characteristics. Furthermore, by arranging the first outdoor heat exchanger 5a and the second outdoor heat exchanger 5b along the facing sidewalls which have a larger area capable of easily taking in the outside air, they can achieve the higher heat exchange efficiency.

Furthermore, the casing 100 has at corners where the facing sidewalls are in contact with the adjacent sidewall piping housing parts 101e to house piping connected to the first outdoor heat exchanger 5a, the second outdoor heat exchanger 5b, or the third outdoor heat exchanger 5c. The first outdoor heat exchanger 5a and the second outdoor heat exchanger 5b each have shorter length than the facing sidewall in the direction along the facing sidewalls by the top view and are located with being spaced apart from the corners where the piping housing parts 101e are provided. The third outdoor heat exchanger 5c has shorter length than the first adjacent sidewall 101c in the direction along the first adjacent sidewall 101c by the top view and is located with being spaced apart from the corners where the piping housing parts 101e are provided. Namely, the first outdoor heat exchanger 5a, the second outdoor heat exchanger 5b, and the third outdoor heat exchanger 5c are arranged so that they do not overlap with the piping housing parts 101e provided in the corners of the casing 100. Thus, by efficiently arranging the outdoor heat exchangers inside the casing 100 and providing the piping housing parts 101e in the corners of the casing 100, the workability of installing the piping and the like can be improved.

The piping housing part 101e houses the branch piping 93, the merge part 91, the connection piping 92 and the like mentioned above. FIGS. 2 and 3 show a part of the piping in the heat pump 1, and other piping may be housed in the casing 100 as appropriate. In the first chamber 101, a part of the piping may be housed in the piping housing part 101e, and other piping which cannot be housed in the same due to a layout limitation may be housed in a space other than the piping housing part 101e.

The separation plate 103 has openings (a first opening 103a and a second opening 103b) through which piping, which connects the components housed in the first chamber 101 and the components housed in the second chamber 102, can pass. Specifically, the first gaseous refrigerant circuit 81 leads from the oil separator 3 provided in the second chamber 102, passes through the separation plate 103 via the first opening 103a, and is connected to the branch piping 93 in the first chamber 101. In addition, the connection piping 92 leads from the third outdoor heat exchanger 5c provided in the first chamber 101, passes through the separation plate 103 via the second opening 103b, and is connected to the second gaseous refrigerant circuit 82 leading from the oil separator 3 in the second chamber 102. In this way, by reducing the number of openings in the separation plate 103 as possible, it is possible to deliver the gaseous refrigerant to suitable places while maintaining the function of the separation plate 103.

In this embodiment, although two openings, the first opening 103a and the second opening 103b, are provided, it is not limited thereto. The pipes connecting between the first chamber 101 and the second chamber 102 may be collected, so that they may pass through a single opening. By reducing the number of openings, a heat blocking effect of the separation plate 103 can be further improved.

The first outdoor heat exchanger 5a, the second outdoor heat exchanger 5b, and the third outdoor heat exchanger 5c are configured to each have a plurality of fins. The third outdoor heat exchanger 5c employs third fins Fb in which an interval between the third fins Fb (third fin pitch F12) is smaller than an interval between first fins Fa (first fin pitch F11) of the first outdoor heat exchanger 5a. The second outdoor heat exchanger 5b employs fins whose fin pitch is substantially equal to the first fin pitch of the first outdoor heat exchanger 5a. In this way, by providing a difference in a fin pitch, a wind velocity of the air through the facing sidewalls can be increased to improve a condensation performance. In this embodiment, although a microtube-type heat exchanger is used as the outdoor heat exchanger, it is not limited thereto. A different type of heat exchanger may be employed. Furthermore, FIGS. 2 and 3 schematically show the first outdoor heat exchanger 5a, the second outdoor heat exchanger 5b, and the third outdoor heat exchanger 5c in such a way that the number of fins is fewer than an actual structure in order to make the difference in fin pitch clear.

It should be noted that embodiments disclosed above are exemplary in all respects, and the invention is not limitedly construed on a basis thereof. Therefore, the technical scope of the present invention should not be construed based on only above described embodiments but be defined based on the statement of the claims It also includes all modifications within the meaning and scope of the claims.

This application claims the benefit of priority to Japanese Patent Application No. 2020-053962 filed as of Mar. 25, 2020. The entirety thereof is incorporated herein by reference. In addition, the entirety of the references cited is incorporated herein by reference.

DESCRIPTION OF REFERENCE NUMERALS

1 Heat pump
2 Compressor
3 Oil separator
4 Four-way valve
5a First outdoor heat exchanger
5b Second outdoor heat exchanger
5c Third outdoor heat exchanger
6 Indoor heat exchanger
7 Accumulator
8 Heat exchanger for evaporation
11 Outdoor expansion valve
12 Indoor expansion valve
20 Oil return piping
40 Discharge path
50 Suction path
51 Filter housing part
52 Filter
80 Gaseous refrigerant circuit
81 First gaseous refrigerant circuit
82 Second gaseous refrigerant circuit
91 Merge part
92 Connection piping
93 Branch piping

The invention claimed is:

1. A heat pump configured to circulate a refrigerant for cooling and heating, the heat pump comprising:
   a first outdoor heat exchanger and a second outdoor heat exchanger, wherein a first port of the first outdoor heat exchanger and a first port of the second outdoor heat exchanger are connected in parallel to a refrigerant source via piping;
   a merge part coupled to a second port of the first heat exchanger and a second port of the second heat exchanger and in which refrigerants flowing out of the second port of the first outdoor heat exchanger and the second port of the second outdoor heat exchanger merge; and
   a third outdoor heat exchanger having a first port connected to the merge part, and wherein the refrigerants flow from the third heat exchanger to the second heat exchanger and the first heat exchanger via the merge part during a first mode of operation and from the second heat exchanger and the first heat exchanger to the third heat exchanger via the merge part during a second mode of operation,
   wherein each of the first outdoor heat exchanger, the second outdoor heat exchanger, and the third outdoor heat exchanger exchanges heat with outside air.

2. The heat pump according to claim 1, wherein the third outdoor heat exchanger has a smaller fin pitch than the fin pitches of the first outdoor heat exchanger and the second outdoor heat exchanger.

3. The heat pump according to claim 1, further comprising:
   a casing configured to house the first outdoor heat exchanger, the second outdoor heat exchanger, and the third outdoor heat exchanger, and
   wherein:
      the first outdoor heat exchanger and the second outdoor heat exchanger are located along facing sidewalls that face each other inside the casing, respectively, and the third outdoor heat exchanger is located along an adjacent sidewall adjacent to the two facing sidewalls.

4. The heat pump according to claim 3, wherein a corner of the casing is configured to house the piping.

5. The heat pump according to claim 1, further comprising:
an oil separator; and
a first gaseous refrigerant circuit and a second gaseous refrigerant circuit configured to deliver gaseous refrigerant separated with the oil separator, and
wherein:
the first gaseous refrigerant circuit is in fluid communication with the second port of the first outdoor heat exchanger and the second port of the second outdoor heat exchanger,
the second gaseous refrigerant circuit is connected to a second port of the third outdoor heat exchanger, and
the first gaseous refrigerant circuit is configured to defrost the first outdoor heat exchanger and the second outdoor heat exchanger and the second gaseous refrigerant circuit is configured to defrost the third outdoor heat exchanger.

6. The heat pump according to claim 1, further comprising:
an oil separator, a four-way valve, and a compressor that are housed in a casing; and
a separation plate configured to separate an inside of the casing into a first chamber and a second chamber, and
wherein:
the first chamber is configured to house the first outdoor heat exchanger, the second outdoor heat exchanger, and the third outdoor heat exchanger, and
the second chamber is configured to house the oil separator, the four-way valve, and the compressor.

7. The heat pump according to claim 6, further comprising:
a first gaseous refrigerant circuit and a second gaseous refrigerant circuit configured to deliver gaseous refrigerant separated with the oil separator, and
wherein:
the first gaseous refrigerant circuit is in fluid communication with the first outdoor heat exchanger and the second outdoor heat exchanger, and
the second gaseous refrigerant circuit is in fluid communication with the third outdoor heat exchanger.

8. The heat pump according to claim 7, wherein:
the first gaseous refrigerant circuit is connected to the merge part in the first chamber,
the second gaseous refrigerant circuit is connected, in the second chamber, to the second port of the third outdoor heat exchanger, and
the separation plate has an opening through which the first gaseous refrigerant circuit passes.

9. A heat pump configured to circulate a refrigerant for cooling and heating, the heat pump comprising:
a first outdoor heat exchanger;
a second outdoor heat exchanger, wherein the first outdoor heat exchanger and second outdoor heat exchanger are connected in parallel with each other;
a third outdoor heat exchanger; and
a merge part in which refrigerants flow from an output of the third outdoor heat exchanger to the first outdoor heat exchanger and the second outdoor heat exchanger,
wherein each of the first outdoor heat exchanger, the second outdoor heat exchanger, and the third outdoor heat exchanger exchanges heat with outside air.

10. The heat pump according to claim 1, further comprising a casing that houses the first outdoor heat exchanger, the second outdoor heat exchanger, and the third outdoor heat exchanger,
wherein the outside air is air exterior to the casing or air that has entered the casing directly subsequent to being exterior to the casing.

11. The heat pump according to claim 1, further comprising a fourth outdoor heat exchanger arranged downstream from the first, second, and third outdoor heat exchangers in a cycle of the first mode of operation and in a cycle of the second mode of operation.

12. The heat pump according to claim 11, further comprising an accumulator, wherein an output port of the fourth outdoor heat exchanger is connected to an input port of the accumulator.

13. The heat pump according to claim 11, wherein an input port of the fourth outdoor heat exchanger is connected to a four-way valve.

14. The heat pump according to claim 11, further comprising a compressor, wherein the fourth outdoor heat exchanger is supplied with heat from a driving source of the compressor.

15. The heat pump according to claim 9, further comprising a casing that houses the first outdoor heat exchanger, the second outdoor heat exchanger, and the third outdoor heat exchanger,
wherein the outside air is air exterior to the casing or air that has entered the casing directly subsequent to being exterior to the casing.

16. The heat pump according to claim 9, further comprising a fourth outdoor heat exchanger.

* * * * *